United States Patent Office 2,885,177
Patented May 5, 1959

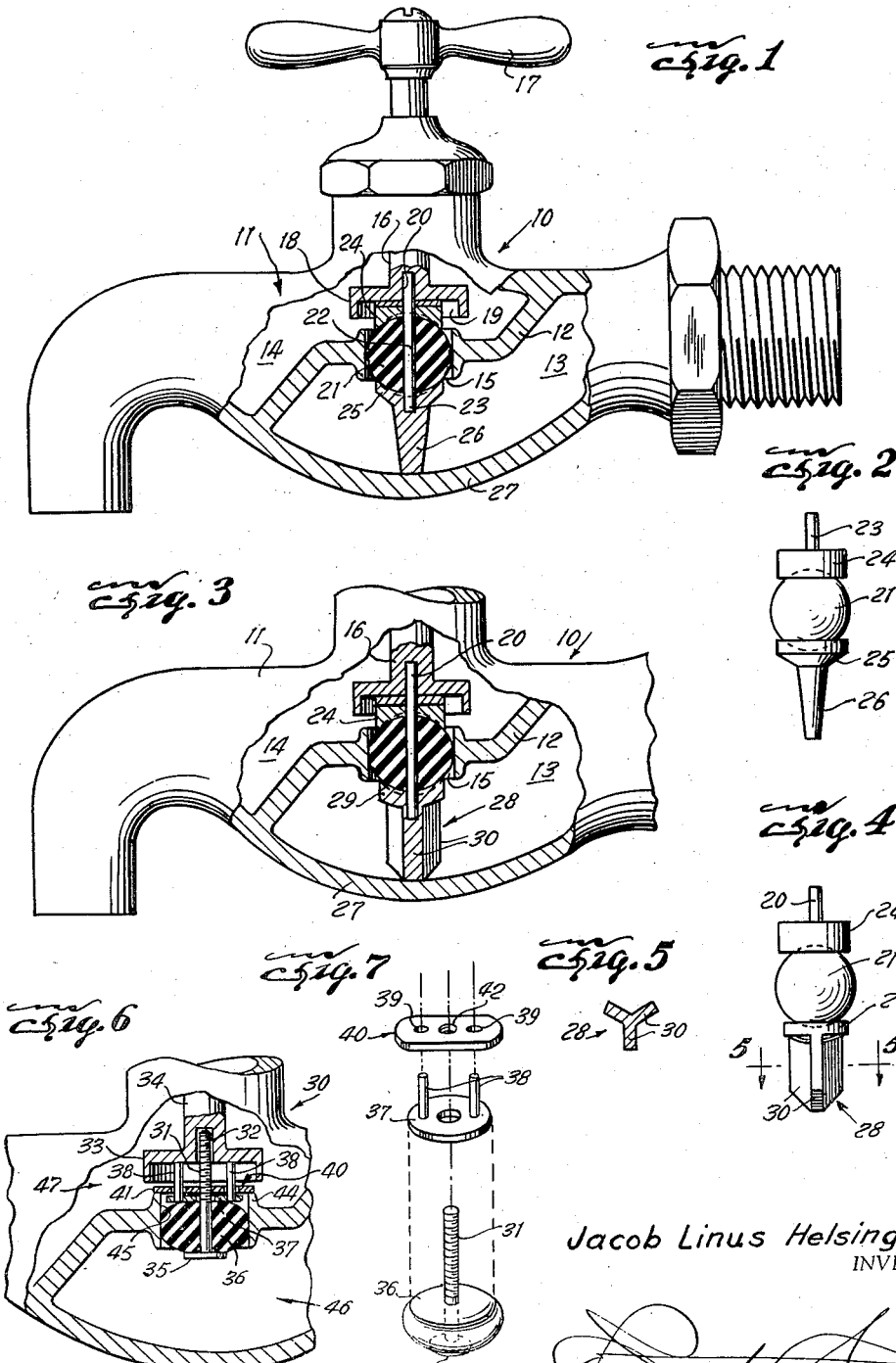

2,885,177
WATER FAUCET VALVE
Jacob Linus Helsing, Dallas, Tex.
Application July 19, 1956, Serial No. 598,789
3 Claims. (Cl. 251—187)

This invention relates to faucets and more particularly to faucets wherein the valve opening and closing the fluid passage therethrough is expandable within the confines of said passage.

The principal object of the invention is to improve upon the conventional faucet valve wherein a ball or washer of resilient material is compressed onto a seat, by providing means whereby a ball of resilient material is expanded under compression within the confines of the seat, thereby increasing the seating area of the fluid passage without damaging the ball by obviating the likelihood of lacerating the ball by compressing the same against the edges of a seat.

Another object of the invention is to provide a faucet valve which is more effective and will last longer than the conventional washer seal type of valve and yet will be in the same general price range of the conventional valve as well as being as easy to install.

Other objects will appear as the description proceeds when considered with the annexed drawing, wherein:

Fig. 1 is a side elevational view of a conventional water faucet with portions broken away to reveal the valve embodying the invention.

Fig. 2 is a view of the valve per se.

Fig. 3 is a fragmentary view of a faucet with parts broken away to show a modification of the valve shown in Figs. 1 and 2.

Fig. 4 is a view of the valve per se shown in Fig. 3.

Fig. 5 is a sectional view taken on line 5—5 of Fig. 4.

Fig. 6 is a further modification of the invention shown in a faucet partly broken away, and Fig. 7 is an exploded view of the valve per se.

Continuing with a more detailed description of the drawing, reference is made primarily to Figs. 1 and 2 wherein reference numeral 10 denotes generally a water faucet of conventional and well known construction. Within the main body 11 of the faucet is formed a partition 12 defining a liquid inlet chamber 13 and a liquid outlet chamber 14. The partition 12 is provided with a circular liquid passage 15.

A stem 16 is movable in a plane perpendicular to the partition 12 above the liquid opening 15 and is manipulated by a handle 17 in the usual manner. On the lower end of the stem 16 is formed or mounted a disc 18 having a circular cavity 19 in its under surface which, in general practice, would contain a sealing washer, held in place by a screw entering a threaded hole 20 extending up into the stem 16.

The present invention consists of a spheroidal body 21 of rubber, neoprene or other rubber synthetics not easily attacked by the liquid passing through the faucet. The ball 21 has a diametrical bore 22 through which is passed a pin 23, the upper end of which is loosely received in the hole 20 in the stem 16. Seated on top of the ball 21 between the latter and the disc 18 is a washer 24, having a concave surface conforming to the surface of the ball.

Below the ball 21 is a seat 25 which is likewise formed with a concave surface in which the ball rests. This seat has an integral stem 26 by which it is supported from the bottom of the bowl 27 of the faucet. The washer 24, ball 21 and the seat 25, while separable, these parts move as a single unit under pressure of liquid entering the chamber 13 when the stem 16 is in retracted position.

When the faucet is to be closed against passage of liquid, the handle 17 is rotated to move the stem 16 downwardly. This action moves the ball 21 downwardly and into the opening 15 in the partition 12. As this occurs, the stem 26 of the ball seat 25 is brought up against the bottom of the bowl 27, hence the ball, being prohibited from further downward movement must expand within the confines of the opening 15 and move laterally into compressive contact with the walls of this opening as the stem 16 continues to move downwardly. When the stem 16 is backed off, the ball 21 and associated parts are displaced upwardly by pressure of liquid seeking outlet from the chamber 13.

In Figs. 3, 4 and 5 is shown a modification of the invention just described. The only difference between this and the earlier described form of the invention resides in the seat for the ball valve, hence identical references will be used for the identification of like parts in modification except for the ball seat itself. In this form of the invention the stem 28 of the ball seat 29 is formed with radial fins 30 so that when the ball 21 is raised by the pressure on liquid in the chamber 13 of the faucet the seat will offer little resistance to liquid passing from the chamber 13 to the chamber 14 through the opening 15 and at the same time, will rotate the seat and the ball 21 so that its position will be frequently changed with respect to the walls of the opening 15 against which the ball is laterally expanded when the faucet stem 16 is lowered.

As in the earlier described form of the invention, the ball 21, washer 24 and seat 29 are separable but move as a single unit, by virtue of the pin 20, under pressure of liquid seeking to exit from the chamber 13 and also when the stem 16 is moved downwardly to advance the washer 24 against the ball to set the stem 28 of the seat 29 against the bottom of the bowl 27 and expand the ball 21 outwardly against the walls of the hole 15.

From the foregoing it is clearly evident that the ball 21 is never without controlled expansion since its upper and lower portions are engaged by the washer and seat and the area of its expansion is embraced by the walls of the liquid passage which it seals when expanded. Therefore, the longevity of the ball is greater than where such a ball is pressed down into a seat which frequently lacerates the material of the ball and since there is no control over its expansion beyond the limits of movement of the valve stem, the material tends to crack and produce leaks at the seat. Moreover, the seats of these conventional valves often become pitted, preventing the ball from fully seating. The present invention, by providing for outward expansion against the walls of the liquid passage, remains operative to insure an adequate seal whether or not the seat is pitted or otherwise possessed of a minor impairment by rust or corrosion.

In Figs. 6 and 7 is shown a further modification of the invention in which reference numeral 30 denotes generally a faucet, fragmentarily shown and broken away to reveal the valve. The valve consists of a pin 31 which is threaded at least a part of its length and freely engages in the threaded bore 32 of the disc 33 carried by the valve stem 34 which, in ordinary use, receives the screw holding a packing washer. In the present case the pin 31 has a disc-like head 35 thereon against which bears a packer 36 of rubber such as neoprene. Next follows a washer 37 which has formed thereon a pair of diametrically spaced upwardly extending pins 38 which are adapted to extend through correspondingly spaced holes 39 in a bridge 40 consisting of a thin, elongated, plate 41.

The bridge 40 has a threaded hole 42 midway between its ends which received the threaded pin 31 and when the valve stem 34 is moved downwardly by rotating the handle 17, the bridge comes to rest on the seat 44 across the fluid passage 45. However, since the pin 31 is not threaded into the bore 32 of the stem 34, the latter can travel downwardly a limited distance while the pin 31 remains motionless due to engagement of the bridge 40, which is stationary on the pin 31, with the valve seat 44. As the stem 34 is moved further downwardly the disc 33 of the stem engages the upwardly extending pins 38 of the washer 37, urging the latter downwardly against the rubber packer 36, which is now positioned within the fluid passage 45, compressing the packer between the washer 37 and the head 35 of the pin 31. Such compressive action expands the packer firmly against the walls of the fluid passage 45 thereby shutting off the flow of fluid through the faucet.

When the valve is to be opened, the stem 34 is backed off, relieving pressure on the packer 36, permitting the same to contract within the confines of the walls of the fluid passage 45. Pressure of fluid flowing from the inlet chamber 46 to the outlet chamber 47 through the fluid passage will displace the valve from the passage, the pin 31 remaining in the bore 32 of the stem 34 at all times but, as stated, is free to move longitudinally therein.

If desired, the packer 36 can be brought under slight compression before its installation in the faucet by threading the bridge downwardly against the washer 37. Thus, the packer can be expanded to nearly equal the diameter of the fluid passage it is to occupy so that the stem 34 will be required to travel but a short distance to effect maximum expansion of the packer against the walls of the fluid passage.

As in the forms of the invention earlier described, the packer expands against the parallel walls of the fluid passage and is not, as conventionally done, compressed against the rim of the fluid passage which is often pitted or otherwise impaired, preventing a positive seat. Of course in the last embodiment of the invention, the packer requires no backing against the bottom of the bowl of the faucet as in the first described examples of the invention, yet equally as effective results are obtained.

Manifestly, the construction as shown and described is capable of some modification and such modification as may be construed to fall within the scope and meaning of the appended claims is also considered to be within the spirit and intent of the invention.

What is claimed is:

1. In combination with a water faucet of the type having a body provided with an apertured partition defining a liquid inlet and a liquid outlet chamber in communication through such aperture, and a manually operable valve stem movable in a plane perpendicular to the partition and axially of the aperture, such stem terminating at its lower end in a disc having a circular cavity therein and there being a tapped hole centrally of said disc extending axially into said stem, a replacement valve unit comprising a spheroid of resilient material having a diameter to be received within said aperture in the partition wall, a guide and stop assembly for guiding said spheroid into said aperture and expanding the same when therewithin to seal said aperture, said guide and stop assembly including a vertical pin projecting diametrically through said spheroid and having its upper end extending slidably into said tapped hole in the valve stem, seating means rigid with the lower end of said pin engaging the undersurface of said spheroid around said pin, and means engageable with said valve body for arresting downward movement of said seating means and pin when said valve stem is moved downwardly, a seat member slidably received on said upper end of the pin and engaging the upper surface of said spheroid around said pin substantially diametrically opposed to that surface portion engaged by said seating means, said valve unit being separate from said valve stem and disc with said seat member being engageable within said circular cavity of the disc, and the vertical height of said seat member being such as to engage the disc when the spheroid is in relaxed state with the upper end of said pin being spaced from the closed end of said tapped hole so that continued downward movement of the valve stem after movement of the seating means has been arrested will effect further downward movement of said seat member to compress said spheroid and expand the same into sealing contact with the wall of said partition defining said aperture while said upper end of the pin moves toward a bottomed position within said tapped hole.

2. The combination as defined in claim 1 wherein said means engageable with said valve body comprises a stem integral with and depending from said seating means.

3. The combination as defined in claim 1 wherein said means engageable with said valve body comprises a bridge plate having a threaded aperture centrally thereof, said pin being threaded in the upper region thereof and engaged in the threaded aperture of said bridge plate, said bridge plate being positioned above said seat member in overlying relationship thereto, said seat member having a pair of upwardly extending pins rigid therewith and said bridge plate having a pair of apertures therein slidably receiving said upwardly extending pins therethrough.

References Cited in the file of this patent

UNITED STATES PATENTS

| 112,000 | Wise et al. | Feb. 21, 1871 |
| 143,294 | Mendham | Sept. 30, 1873 |
| 408,701 | Everett | Aug. 13, 1889 |
| 855,350 | Singmaster | May 28, 1907 |
| 1,047,333 | Theis | Dec. 17, 1912 |
| 1,779,893 | Schmitz | Oct. 28, 1930 |
| 2,171,938 | Larry | Sept. 5, 1939 |

FOREIGN PATENTS

| 454,546 | Great Britain | Oct. 2, 1936 |
| 1,079,220 | France | May 19, 1954 |